Aug. 7, 1962     G. B. McROBERTS ET AL     3,047,892

MEAT CLEANING MACHINE

Filed Nov. 30, 1959     3 Sheets-Sheet 1

INVENTOR.

GUY B. McROBERTS AND NEAL H. BLACKFORD

BY Ralph W. Kalish

ATTORNEY

*INVENTOR.*
GUY B. McROBERTS AND NEAL H. BLACKFORD
BY Ralph W. Kalish

ATTORNEY

United States Patent Office 3,047,892
Patented Aug. 7, 1962

3,047,892
MEAT CLEANING MACHINE
Guy B. McRoberts, 6963 Winona, and Neal H. Blackford, 6652 Mardel, both of St. Louis, Mo.
Filed Nov. 30, 1959, Ser. No. 856,199
1 Claim. (Cl. 15—3.17)

This invention relates to an improved machine for cleaning meat preparatory to restaurant usage or retail sale.

It is an object of the present invention to provide a machine adapted for automatically cleaning the surfaces of sections or cuts of meat such as steaks, chops, roasts, and the like, for rendering same suitable for restaurant usage, or for sale at retail, as in supermarkets, and the like.

It is a further object of the present invention to provide a meat cleaning machine adapted for use with sections or cuts of meat of varying thickness, said machine incorporating easily operated means for adjusting same in minimum time for receiving successive cuts of meats of differing thicknesses.

It is an additional object of the present invention to provide a machine of the character stated which is designed to operate automatically for advancing a meat cut through the machine and presenting opposite surfaces thereof to cleaning elements for removal of bone scrap and other residual particles resulting from butchering operations.

It is a further object of the present invention to provide a meat cleaning machine incorporating brush elements for operation upon meat presented thereto, and which elements are adapted to be maintained in a continuous, clean state for assuring constant, effective operation.

It is a still further object of the present invention to provide a meat cleaning machine which is economical in construction, having a simplicity of parts and being, hence, resistant to breakdown; which is reliable and durable in usage; and which does not require the services of skilled personnel.

Other objects and details of the invention will be apparent from the following description, when read in connection with the accompanying drawings (3 sheets) wherein.

Figures 1, 2:
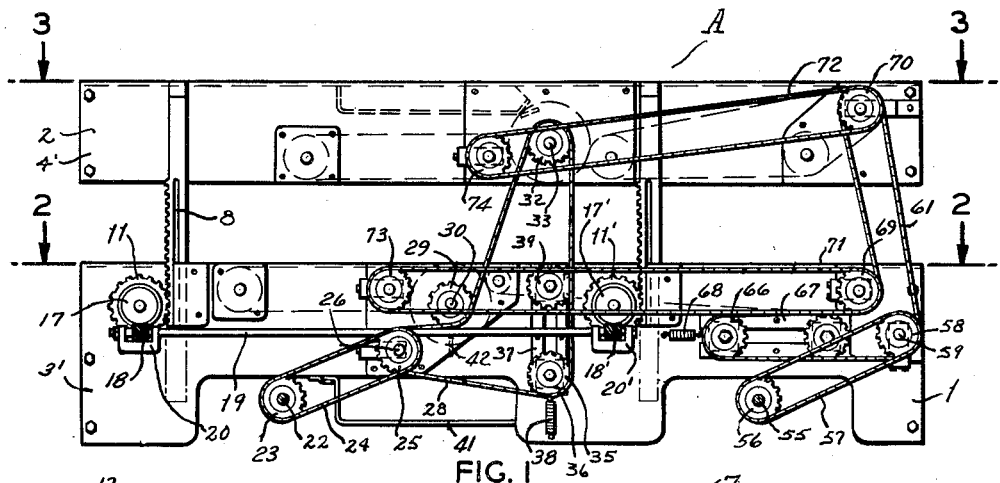
FIGURE 1 is an elevational view of the rearward side of a meat cleaning machine constructed in accordance with and embodying the present invention.
FIGURE 2 is a horizontal transverse section taken on the line 2—2 of FIGURE 1.

Referring now by reference characters to the drawings which illustrate the preferred embodiment of the present invention, A designates a meat cleaning machine comprising a base frame 1 and an upper frame 2, which are vertically aligned in planar parallel relation. Said frames 1, 2 are each of rectangular cross-section incorporating horizontally, spaced apart, parallel side plates 3, 3' and 4, 4', respectively, which pairs of side plates are interconnected at their ends by transversely extending bars or tie-rods 5 for integrating the respective frames into rigid, stable structures. Said frames 1, 2 are adapted for readily controllable movement relatively toward and away from each other for presenting an intervening space commensurate with the section or cut of meat to be treated by machine A. For effecting this vertical adjustability there are provided two pair of vertically presented racks 6, 6', there being one such pair of racks located on each outer side face of machine A, so that racks 6 are horizontally aligned and racks 6' are mutually horizontally aligned. Each of said racks in its upper portion is fixed to the respective side plates 4, 4' of upper frame 2 and have their lower ends received within guideways 7 formed in members 10. Each rack 6, 6' is axially slotted, as at 8, for freely receiving the tongue 9 of a stabilizing member 10 secured on said side plates 3, 3'. Each of the racks 6, 6' respectively mesh with spur gears 11, 11'; said spur gears 11 being carried on the opposite, projecting ends of a shaft 12 while spur gears 11' are similarly mounted on a shaft 12' which shafts are journaled in side plates 3, 3' for extension therebetween. Provided on the forward, outer end of shaft 12 is a hand crank 13 for controlling elevation and decent of frame 2. Spur gear 11, adjacent hand crank 13 meshes with a pinion 14 mounted on a stub shaft 15 journaled in plate 3 which gear 14 in turn engages a control dial 16, the outer face of which is provided with graduated markings so as to permit ready determination of the extent of elevation of upper frame 2 above base frame 1. For transmission of motion from shaft 12 to shaft 12' there is provided on the rearward projecting extremity of shafts 12, 12' a worm gear 17, 17', respectively, which mesh with worms 18, 18' secured on the opposite ends of a shaft 19, located outwardly of plate 3' in axially parallelism therewith and which at its ends are journaled in bearings 20, 20' secured upon plate 3'. Thus, upon turning of hand crank 13 upper frame 2 may be easily and smoothly moved upwardly or downwardly with respect to base frame 1 so as to provide the requisite spacial relationship, as will be seen more fully hereinbelow. Therefore, the rack and gear arrangement provides a novel arrangement whereby machine A is adapted for efficiently treating sections of meat of varying thickness thereby rendering said machine highly versatile and constituting a marked advance over current machines.

Disposed adjacent, and outwardly, of frame plate 3' is a prime mover 21 having a drive shaft 22 which mounts a sprocket 23 connected by a drive chain 24 to a sprocket 25 mounted for rotation upon the outer end of a stub shaft 26 journaled in frame plate 3' upon which there is carried, inwardly of sprocket 25, a sprocket wheel 27 having engaged thereabout one end portion of a drive chain 28. One course of drive chain 28 is directed upwardly for engaging a sprocket 29 mounted on the outer, diametrally reduced end 30 of a lower brush member 31 extending transversely between side plates 3, 3' and in which said reduced ends of brush member 30 are journaled. From sprocket 29 chain 28 is thence led upwardly for disposition about a sprocket wheel 32 mounted on the shaft-forming end 33 of an upper brush member 34 which extends between side plates 4, 4' in axial parallel relation to lower brush member 31 but being offset axially of machine A with respect thereto so that said brush members 31, 34 are not vertically aligned. The ends 33 of upper brush member 34 are journaled in side plates 4, 4' for rotation of said brush member 34. From sprocket wheel 32 drive chain 28 progresses downwardly for engagement about a take-up sprocket 35 from whence it proceeds about sprocket wheel 27 to complete its path of movement. Take-up sprocket 35 is carried on a slide block 36 disposed within a vertical slideway 37 mounted on frame plate 3' and is biased downwardly by an extension spring 38; there being a companion directing sprocket 39 mounted spacedly above, and aligned with, said take-up sprocket 35. Thus, said take-up sprocket 35 will assure the maintenance of desired tension upon drive chain 28 as upper frame 2 is moved away and toward base frame 1 for accommodating the various meat sections fed to machine A and thereby assure proper operation of upper and lower brushes 34, 31.

Each brush 31, 34 incorporates a spirally arranged series of bristles, as indicated at 40, which may be preferably formed of nylon or like durable relatively rigid material for efficiently and reliably scrapingly cleaning the meat surfaces presented thereto.

Removably mounted upon base frame 1, downwardly of lower brush 31, is a tray 41 for receiving matter removed from the meat surfaces by said lower brush 31 and there being provided a comb 42 which is secured at its ends in frame plates 3, 3' immediately beneath lower brush 31 for engaging the bristles 40 thereof so as to remove particles of matter which might normally adhere thereto and thus maintain the bristles in a constant state of cleanliness. Carried detachably upon upper frame 2 is a similar tray or receptacle 43 for receiving removed particles from upper brush 34; there being a comb 44 extending between upper plates 4, 4' and disposed at an acute angle to the vertical for engaging the upper portion of upper brush 34 so as to deflect the particles therefrom into tray 43. Trays 41, 43 may be removed at convenient intervals for emptying same as necessary.

Figure 5:
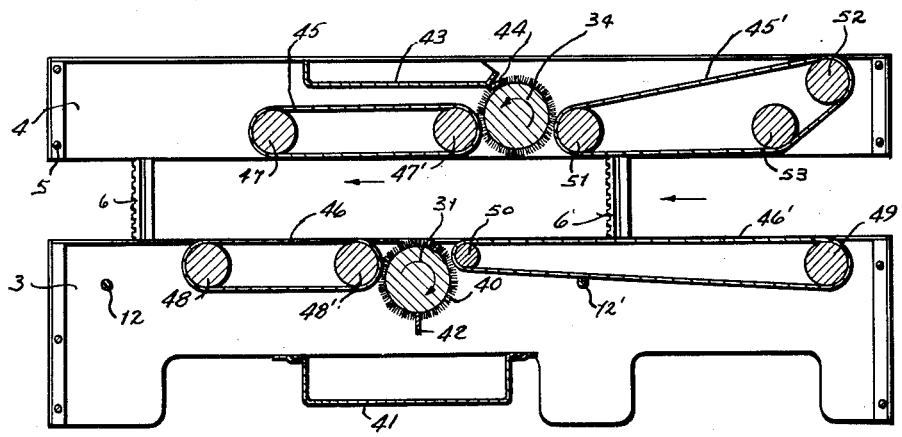
FIGURE 5 is a vertical transverse section taken on the line 5—5 of FIGURE 3.

For advancing sections of meat through machine A there is provided a conveyor system incorporating a pair of upper, and a pair of lower, endless belts 45, 45' and 46, 46', respectively, disposed on opposite sides of the related brush members 31, 34 and with their adjacent portions in immediate proximity thereto. The upper courses of lower belts 46, 46' and the lower courses of upper belts 45, 45' are aligned with the upper and lower edges of the associated frame plates 3, 3' and 4, 4'. Conveyors 45, 46, which are in opposed relationship on the machine discharge side of their related brushes, are each trained about a pair of rollers 47, 47' and 48, 48', respectively, rotatably mounted on their respective frame plates. Similarly, conveyor belts 45', 46' which are in opposed relationship on the machine feed side of their related brushes, are engaged about rollers; belt 46' being carried on rollers 49, 50 extending between, and journaled in, frame plates 3, 3', and with the latter being of relatively reduced diameter to allow belt 46' to be brought into close adjacency to brush 31; and with belt 45' being disposed about rollers 51, 52 and a directing roller 53 rotatably mounted at their ends in frame plates 4, 4' (FIGURE 5).

Figure 3:
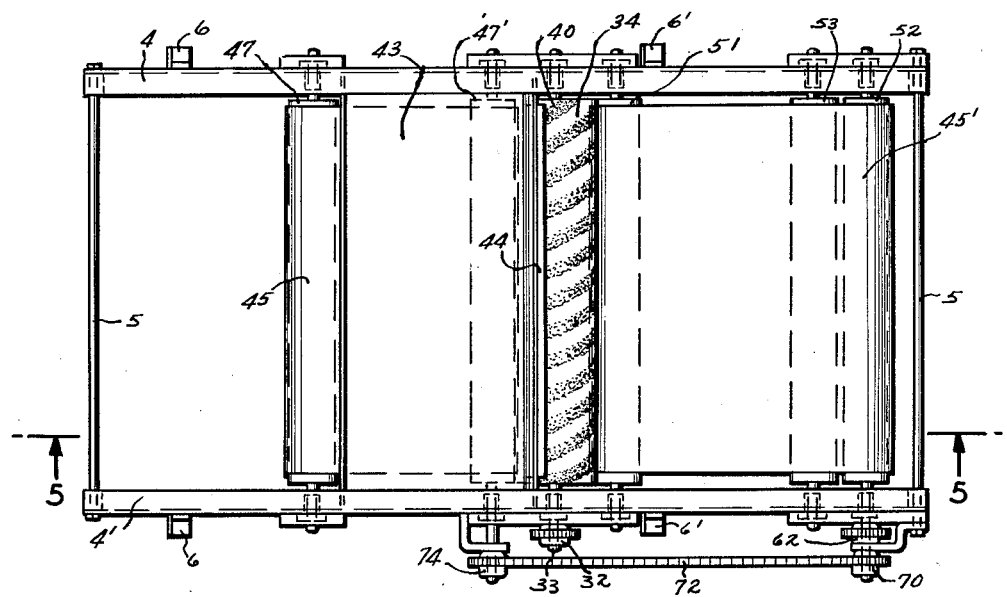
FIGURE 3 is a horizontal transverse section taken on the line 3—3 of FIGURE 1.
Figure 4:
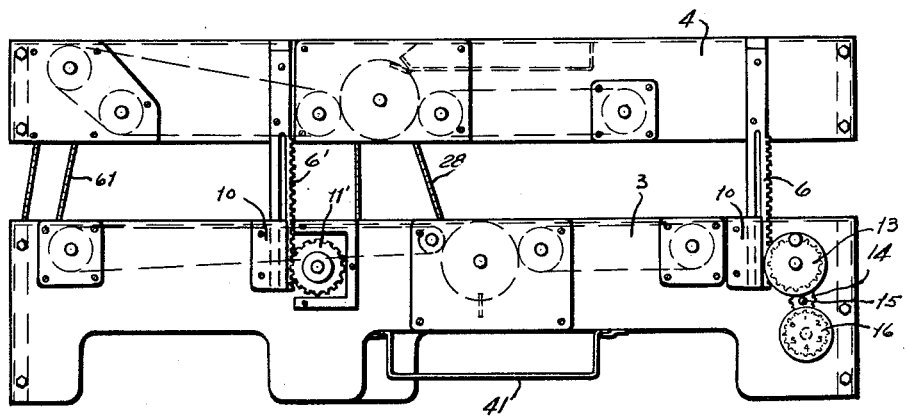
FIGURE 4 is an elevational view of the forward side of the machine.

This conveyor system is powered by a prime mover 54 having a drive shaft 55 which carries a sprocket 56 for connection by a drive chain 57 to a sprocket 58 secured upon a short shaft 59 mounted on plate 3'. Said shaft 59 also mounts a sprocket 60 which is drivingly connected by a drive chain 61 to a sprocket wheel 62 mounted on the projecting, shaft-forming end of roller 52 (FIGURE 3). Drive chain 61 progresses downwardly from sprocket 62 for engaging a guide sprocket 63 to be directed horizontally therefrom for disposition about a take-up sprocket 64 and thence returns therefrom toward sprocket 60 (see FIGURES 1 and 2) with the horizontal courses of said chain 61 engaging opposite portions of a sprocket wheel 65, cooperative with take-up sprocket 64. Said latter sprocket 64 is carried on a block 66 slideably disposed in a horizontal slideway 67 and is biased toward the remote or discharge end of machine A by an extension spring 68. Thus, as the conveyors upon both frames are being driven by a single power unit, take-up sprocket 64 assures proper tension on drive chain 61 regardless of the spacial relationship between frames 1 and 2.

Sprocket 63 is carried upon an extension of roller 49 (FIGURE 2) so that the operation of conveyors 45, 46' is apparent through the driving connection between their associated sprockets 62, 63 and drive chain 61. Mounted on the extensions of rollers 49, 52, outwardly of sprockets 63, 62, respectively, are sprocket wheels 69, 70, respectively, about which are engaged drive chains 71, 72, respectively, which extend toward the opposite or discharge end of machine A, outwardly of the related side plates 3', 4' for engagement about sprocket wheels 73, 74 carried upon extension of rollers 48', 47', respectively, whereby conveyors 46, 45 are driven (FIGURES 2, 3). It will therefore be seen that the conveyors in the upper and base frames 2, 1 are simultaneously driven by the same power source and, hence, are designed to operate in a reliable and economical manner. It is to be further especially noted that the belts of the conveyor system are adapted to move sections of meat fed to the machine from the feed end to the discharge end in the direction of the arrows shown in FIGURE 5 so that the meat sections are advanced linearly through the machine and with the upper and lower surfaces of the meat sections being engaged by the opposed belts of the conveyor system. Thus, the meat sections are, in fact, positively engaged by the belts so that the same are carried through the machine in an efficient manner. As a meat section reaches the location of upper brush 34 its bottom face will remain in contact with conveyor 46' so that it is being directed past brush 34 for operation of the latter upon its upper surface to remove all extraneous matter therefrom. Similarly, upon presentation of the lower face of the meat section to lower brush 31, the opposite upper surface of said meat section will engage belt 45 and thus be assisted past brush 31. It will therefore be observed that with brushes 31, 34 in offset or staggered relationship meat sections will be simultaneously engaged by opposed belt portions so as to assure constant travel of the meat sections through the machine.

In view of the novel means set forth herein for raising and lowering upper frame 2, machine A is uniquely adapted to handle meat sections of varying thickness. Thus, by simple operation of hand crank 13 upper frame 2 is adjusted so that the particular meat section being fed to the machine will be positively engaged by the opposed belts and with its surfaces thus disposed for maximum operation thereagainst by brushes 31, 34. Brushes 31, 34 are adapted to rotate in a direction counter, or opposite, to the direction of travel of the meat sections so that a resisting force is developed against the movement of the meat which is productive of complete meat cleansing action by the aforesaid brushes. Machine A thus as set forth hereinabove is a compact, self-contained unit having minimum size and a simplicity of parts so that it may be easily utilized in small as well as large commercial establishments of all types. The same is not prone to breakdown and, hence, will operate in a reliable, highly efficient manner and the services of skilled personnel are not needed in the utilization of the same.

Furthermore, it is to be particularly pointed out that machine A may be very easily maintained in a clean state of high efficiency as brushes 31, 34 may be adapted for facile removal to permit, if desired, extensive cleaning, repair, or replacement, and, additionally, the various conveyor belts may be simply removed through the provision of conventional retractable bearings, or by means of shaft coupling arrangements, whereby said conveyors may be quickly and expeditiously cleaned and restored to operative position.

It should be understood that changes and modifications in the formation, construction, arrangement, and combination of the several parts of the meat cleaning machine may be made and substituted for these herein shown and described without departing from the nature and principle of our invention.

Having thus described our invention, what we claim and desire to secure by Letters Patent is—

A meat-cleaning machine adapted for ready portability comprising a rectangular base frame, a rectangular upper frame in vertically registering relationship with said base frame, rack and gear means interconnecting said upper and base frames by operation of which said frames may be disposed in mutually abutting relation for compact storage or transportability, or in pre-selected spaced relationship for accommodating therebetween cuts of meat of varying thickness, control means associated with said rack and gear means for operation thereto, at least two conveyor sections carried by each of said base and upper frames, a brush element rotatably mounted on each of said upper and base frames, being adapted to rotate about an axis extending transversely of the associated frames, said brushes being disposed between the conveyor sections of the related frame, said brushes being mutually offset with respect to each other so that during operation of the machine the meat cut passing therethrough will be sequentially engaged by the brushes on its corresponding opposite faces, the meat-contacting portions of said brushes being substantially aligned with the meat-engaging surfaces of the conveyors whereby during machine operation a meat cut in traveling across the brush of the base frame will be supported thereon, a first drive means for driving said conveyor sections for advancing a cut of meat through the machine, and a second drive means for rotation of said brush elements in a direction opposite to the direction of travel of the conveyor sections, one of the base conveyor sections being opposite the brush of the upper frame, one of the upper conveyor sections being opposite the brush of the base frame.

References Cited in the file of this patent
UNITED STATES PATENTS

| | | |
|---|---|---|
| 1,670,809 | Hormel | May 22, 1928 |
| 1,817,332 | Worrell | Aug. 4, 1931 |
| 2,817,862 | Frazho et al. | Dec. 31, 1957 |
| 2,827,645 | Miller | Mar. 25, 1958 |

FOREIGN PATENTS

| | | |
|---|---|---|
| 1,131,950 | France | Oct. 29, 1956 |